May 19, 1959
C. H. WATKINS
2,886,899
FLUIDIZED SOLIDS LEVEL CONTROL
Filed Aug. 26, 1957
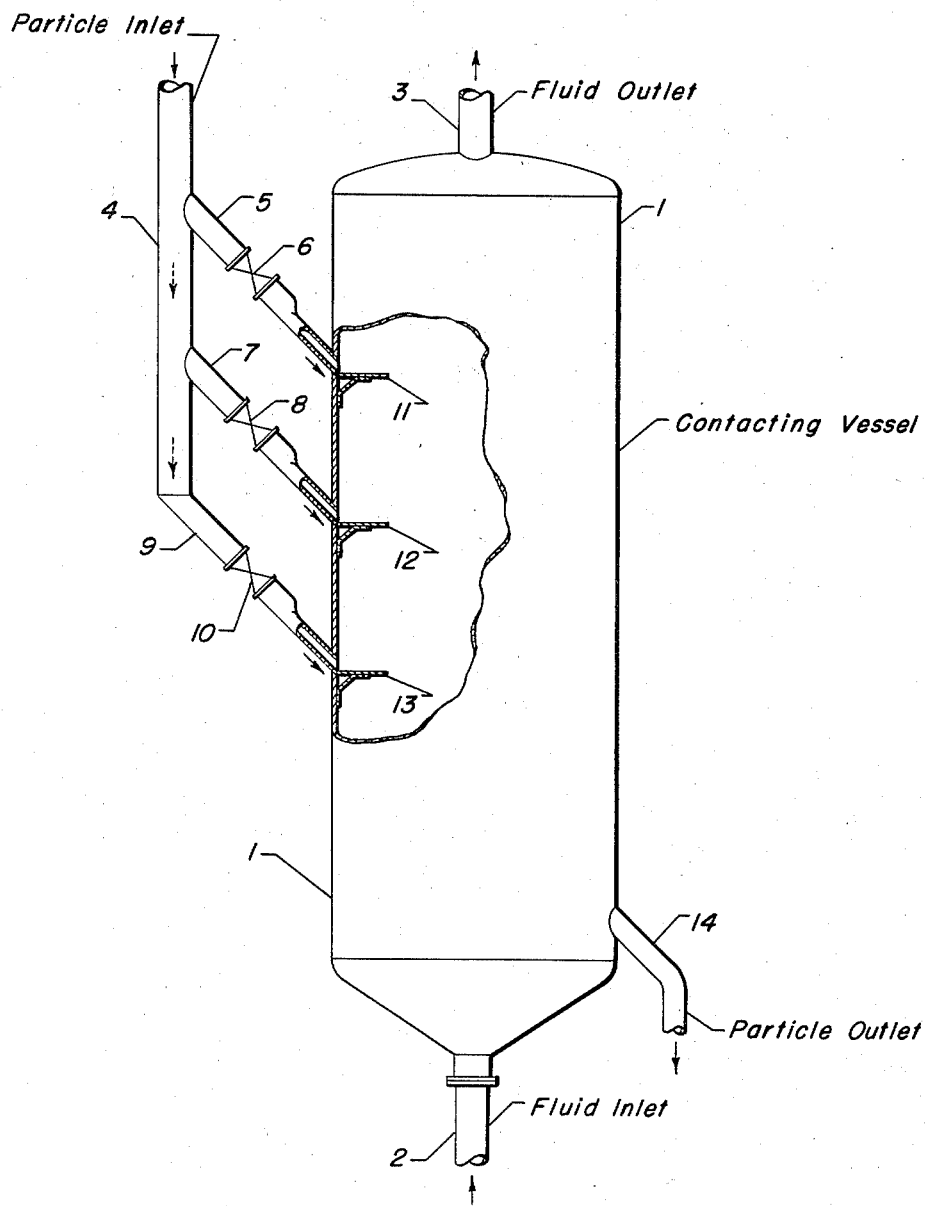
INVENTOR:
Charles H. Watkins
BY:
Chester J. Giuliani
Glen R. Grunewald
ATTORNEYS:

United States Patent Office 2,886,899
Patented May 19, 1959

2,886,899

FLUIDIZED SOLIDS LEVEL CONTROL

Charles H. Watkins, Arlington Heights, Ill., assignor to Universal Oil Products Company, Des Plaines, Ill., a corporation of Delaware Application August 26, 1957, Serial No. 680,094

6 Claims. (Cl. 34—57)

This invention relates to a vessel for contacting particles of solid material with a fluid in a manner known as fluidized bed contacting and in particular, this invention relates to a vessel in which the level of a fluidized solid particle bed is maintained at a fixed, predetermined position.

The technique of employing a fluidized bed of solid particles for contacting solids with fluids is now widely used in processes such as drying or effecting chemical reactions in the presence of a heterogeneous catalyst. A fluidized bed consists of particles of solids through which a fluid passes upwardly thereby maintaining the solids in a suspended state and maintaining the bed in an expanded condition. The solids are out of continuous contact with each other, are continuously moving and free to circulate from the top to the bottom of the bed giving the appearance of a boiling liquid. This very successful contacting technique is beneficial because it overcomes many problems associated with contacting fluids with solids such as uneven utilization of the solids, varying temperatures throughout the bed, etc.

One of the problems associated with the fluidized bed contacting technique is maintaining the level of the fluidized bed at a known position. When there is no control over the position of the fluidized bed level, the bed may expand out of the vessel thereby causing a loss of solid particles. Operating without a known inventory of solid material produces more serious difficulties in inability to predict the stoichiometry of the process, or the time of contact between the fluid and the solid. The problem of maintaining a known inventory of solids or a constant level of a fluidized bed is even more acute when the process effected requires fluidized contacting and continuous addition of solids to and removal of solids from the bed. It is an object of this invention to provide a contacting chamber in which the level of a fluidized bed of particles within it is always known even though particles are continuously introduced into and withdrawn from the chamber.

In one embodiment, this invention relates to a contacting vessel comprising in combination an enclosed vessel having a lower fluid inlet and upper fluid outlet, a particle inlet between said fluid inlet and outlet, a particle outlet below said particle inlet and a shelf disposed directly beneath said particle inlet, said shelf extending a sufficient distance so that the normal angle of repose of the particles extending from the apex of said particle inlet will not intersect all portions of said shelf but the angle of fluidization divergence of said particles extending from the apex of said particle inlet will intersect all portions of said shelf.

Briefly, this invention comprises a combination of a contacting vessel having at least one solid particle inlet and having one internal shelf directly beneath each particle inlet which coacts with it to maintain the level of the fluidized solid particle bed in the immediate vicinity of the inlet. The operation of this invention depends upon the disruption of the normal angle of repose of solid particles in order to function. The dimensions of the shelf associated with each inlet and its position are such that when the vessel is empty and the particle inlet is open, particles coming in through the inlet fall upon the shelf and the normal angle of repose of the particles causes them to spill off of the shelf into the main body of the vessel. The particles thus entering are fluidized by the rising fluid stream, however, the fluidized bed of particles remains in the lower portion of the vessel until sufficient particles have spilled off of the shelf to cause the level of the fluidized bed to rise to the level of the shelf. When the shelf is submerged in fluidized particles the normal angle of repose is disrupted by the dense fluidized bed into which the particles must flow and accordingly, the flow of particles from the shelf is stopped. When sufficient particles are withdrawn from the vessel so that the level of the bed is below the shelf, the normal angle of repose again is effective and more particles spill from the shelf to bring the level back up to the vicinity of the shelf. The overall result is an imperceptible series of fluctuations of the bed level in the vicinity of the particle inlet.

The shelf associated with each particle inlet must be short enough so that the normal angle of repose of the particles employed will cause them to spill off of the shelf and into the vessel when the particle inlet is opened. It has been found that the angle of repose for a material is changed when the shelf is surrounded by a fluidized bed of particles. The denser medium, i.e., the fluidized solids, into which the particles must flow requires a steeper angle than the angle of repose and this angle is defined as the angle of fluidization divergence.

The critical limitations on the position and dimensions of the shelf associated with each particle inlet are that the angle of fluidization divergence extended in any direction from the apex of the particle inlet must intersect the shelf but the normal angle of repose of the particles extended from the apex of the particle inlet must not intersect the shelf at all points. With these limitations it may be seen that shelves maintained relatively far below the particle inlet must be longer than shelves maintained immediately below it and shelves maintained below vertically elongated particle inlets must be longer than shelves maintained below shorter or horizontal particle inlets. The shelves may be rounded or square and they may be horizontal or tilted, however, they are preferably rounded and horizontal. It is also preferred that the particle inlets are vertically foreshortened so that the shelves may extend into the vessel as little as possible.

The operation of the vessel of this invention may be better described with relation to the accompanying drawing which illustrates one embodiment of this invention in a partially sectioned elevation view of a suitable vessel.

A contacting vessel 1 is provided with a fluid inlet 2 and a fluid outlet 3 for introducing and removing the fluid to be contacted with the solid particles. A typical fluid may be a vaporized hydrocarbon fraction which is to undergo cracking in the presence of a heterogeneous particulate catalyst such as silica-alumina microspheres. The silica-alumina microspheres are introduced through particle inlet 4 and one of lines 5, 7 and 9. For purposes of illustration, line 7 and valve 8 will be employed for introducing particles and, therefore, valve 6 and valve 10 in lines 5 and 9 respectively will be closed. In the preferred embodiment shown, lines 5, 7 and 9 are bent to provide a vertically foreshortened entrance into vessel 1 so that shelves 11, 12 and 13 may extend a minimum distance into vessel 1.

Hydrocarbon is introduced through inlet 2 and catalyst particles are introduced through line 7 spilling onto shelf 12. The normal angle of repose for silica-alumina microspheres is about 60 degrees and, therefore, the particles will spill from shelf 12 and fall into the main body of vessel 1 forming a fluidized bed within the vessel and contacting the upwardly flowing vapor phase hydrocarbon stream to promote the cracking of that stream. Particles will continue to spill from shelf 12 until the level of the fluidized bed is high enough to submerge shelf 12 within the bed. When shelf 12 is surrounded with a fluidized bed of particles, the angle of fluidization divergence controls whether or not particles will flow from shelf 12 into vessel 1, and since shelf 12 intersects that angle, the flow of particles stops.

The catalytic cracking reactions are such that a heavy carbonaceous deposit forms on the catalyst so that it loses activity after a period of use. This activity can be restored by burning the carbonaceous deposit from the catalyst in a separate oxidative regeneration zone and in order to restore the activity of the catalyst particles, outlet 14 which connects to a regeneration zone is provided. Catalyst particles are continuously withdrawn through outlet 14 and introduced into a regeneration zone wherein the activity of the catalyst is restored, after which the reactivated catalyst particles are returned to particle inlet 4 to be reintroduced into contacting vessel 1. The catalyst may be maintained at any desired activity by regulating the withdrawal rate of spent particles since the withdrawal rate of spent catalyst particles through outlet 14 automatically adjusts the introduction rate of fresh or regenerated catalyst particles through line 7 and valve 8 by lowering the level in the vessel so that shelf 12 is no longer surrounded with a fluidized bed and the normal angle of repose again controls, allowing more catalyst to flow. The inventory of catalyst within contacting vessel 1 will determine, along with other factors such as the process temperature and the characteristics of the charge, the extent of cracking which is effected. A deep catalyst bed with all other conditions equal, will cause more cracking than a shallow catalyst bed of the same diameter since the reaction-promoting influence of the catalyst will have an effect upon the hydrocarbon for a longer period of time. It may, therefore, be desirable when different products are required or when a different charge stock is employed to either increase the amount of conversion or to decrease it. If it is desired to increase the conversion, this may be accomplished by closing valve 8 and opening valve 6 so that the level of the fluidized bed of catalyst particles will be around shelf 11 instead of shelf 12. When it is desired to decrease the amount of conversion, valve 10 may be opened and valves 8 and 6 closed so that the level of catalyst is in the vicinity of shelf 13. Although three catalyst inlets are shown, any number may be used and they may be disposed at the same or different levels. Whichever inlet is employed, by the use of this invention a constant inventory and constant level of catalyst are maintained within vessel 1 regardless of the rate of withdrawal or the opening in the particle inlet valve. The constant inventory of vessel 1 is not only peculiarly immune to varying process conditions and plant upsets but it is obtained without expensive instrumentation or flow restricting orifices which require adjustment and maintenance. The valves in the particle inlet lines are either entirely opened or entirely closed and are not used to regulate the flow rate and are, therefore, not subject to the abrasion that solid particles cause in flow-restricting control valves.

The angle of repose for solid particles is usually from about 45° to about 70° from vertical depending on their density and form. Spherical particles and denser particles will have a less steep angle of repose. The angle of repose for any specific material can readily be determined by experimentation. The angle of fluidization divergence for any particulate material can similarly be readily obtained by experimentation and usually about ½ the angle of repose. For example, ground silica-alumina catalyst particles have an angle of repose of about 60° from the vertical and an angle of fluidization divergence of about 30° from vertical. One thing common for all materials is that there is a large difference between the two angles so that close tolerances in the dimensions of the shelves are not required.

Although the particle inlets shown herein enter through the side of the contacting vessel, it is within the scope of this invention to employ a long dip-leg type particle inlet extending down from the top of the vessel and having a shelf fixed to the bottom of it. In low pressure applications this inlet may be vertically adjustable so that the bed level may be maintained at any position.

From the foregoing description, it may be seen that the reaction vessel of this invention provides a sure and economical means for maintaining a constant inventory of particles in a fluidized bed without elaborate control valves and instruments.

The contacting vessel and method for employing it may be employed for cracking higher boiling hydrocarbons boiling from the gas oil range or lower to the topped crude or vacuum bottoms boiling range by contacting the hydrocarbons to be cracked with catalyst of the alumina or silica-alumina type which may contain group VI or group VIII metals or combinations thereof at temperatures of from about 700° F. to about 1000° F. or higher with or without hydrogen and at pressures of from about 15 p.s.i. to about 20,000 p.s.i. or more.

The vessel may also be employed to effect reforming reactions, hydrogenation reactions, dehydrogenation or demethylation of aromatic or aliphatic hydrocarbons, destructive distillation or gasification of coal, retorting of shale or tar sands, drying or oxidation of inorganic or organic solids and many more processes.

I claim as my invention:

1. A vessel for contacting solid particles with a fluid comprising in combination an enclosed vessel having a lower fluid inlet and upper fluid outlet, a particle inlet between said fluid inlet and outlet, a particle outlet below said particle inlet and a shelf disposed directly beneath said particle inlet, said shelf terminating short of a line extending from the apex of said particle inlet at an angle of from about 45° to about 70° from vertical and the shelf extending beyond a line extending from the apex of said particle inlet at an angle from vertical approximately ½ the first-mentioned angle.

2. The contacting vessel of claim 1 further characterized in that said contacting vessel contains a plurality of vertically disposed particle inlets.

3. The contacting vessel of claim 1 further characterized in that said shelf is sealed against said vessel wall and the portion extending into said vessel is circular.

4. The contacting vessel of claim 1 further characterized in that said particle inlets are vertically foreshortened.

5. A contacting apparatus comprising an enclosed vessel having a lower fluid inlet and an upper fluid outlet, a particle inlet between said fluid inlet and outlet, a particle outlet below said particle inlet, and a shelf directly beneath said particle inlet and extending substantially horizontally across a portion of said vessel, said shelf terminating between a pair of lines extending from the apex of said particle inlet, one of said lines being at an angle of from about 45° to about 70° from vertical and the other being at an angle from vertical approximately ½ the first-mentioned angle.

6. A contacting apparatus comprising an enclosed vessel having a lower fluid inlet and an upper fluid outlet, a particle inlet between said fluid inlet and outlet, a particle outlet below said particle inlet, and a shelf directly beneath said particle inlet and extending substantially horizontally across a portion of said vessel, said shelf terminating between a pair of lines extending from the apex of said particle inlet, one of said lines being at an angle of about 60° from vertical and the other being at an angle of about 30° from vertical.

References Cited in the file of this patent
UNITED STATES PATENTS

| | | |
|---|---|---|
| 2,684,890 | Lapple et al. | July 27, 1954 |
| 2,717,869 | Turner | Sept. 13, 1954 |
| 2,766,185 | Pansing | Oct. 9, 1956 |